Sept. 14, 1965 K. WEINHOLD 3,206,230
HOSE COUPLING
Filed Feb. 23, 1961 5 Sheets-Sheet 1

INVENTOR
Karl WEINHOLD

BY Toulmin & Toulmin
ATTORNEYS

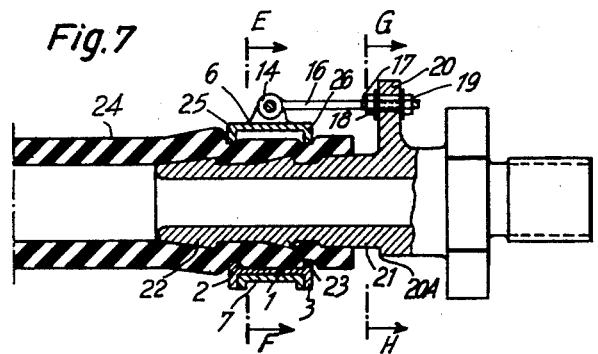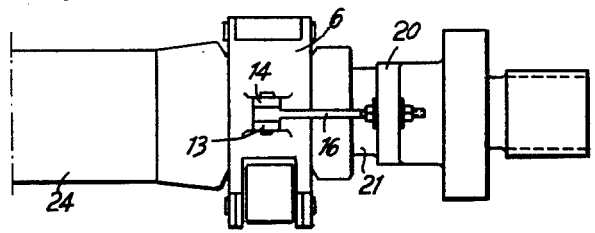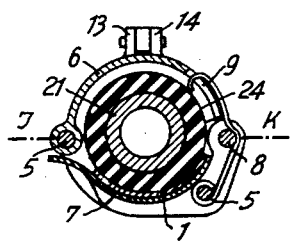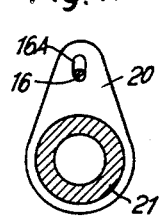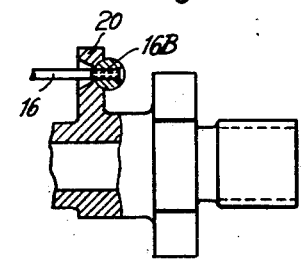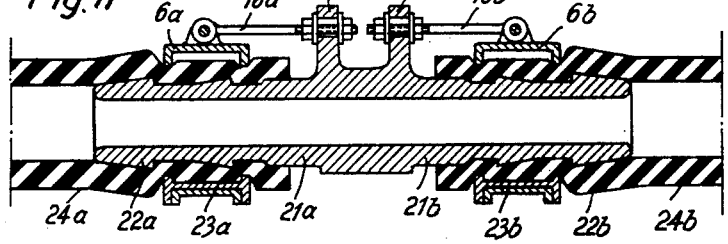

Sept. 14, 1965      K. WEINHOLD      3,206,230
HOSE COUPLING

Filed Feb. 23, 1961      5 Sheets-Sheet 3

INVENTOR
Karl WEINHOLD

BY Toulmin & Toulmin
ATTORNEYS

Sept. 14, 1965 K. WEINHOLD 3,206,230
HOSE COUPLING
Filed Feb. 23, 1961 5 Sheets-Sheet 4

INVENTOR
Karl WEINHOLD

BY Toulmin & Toulmin
ATTORNEYS

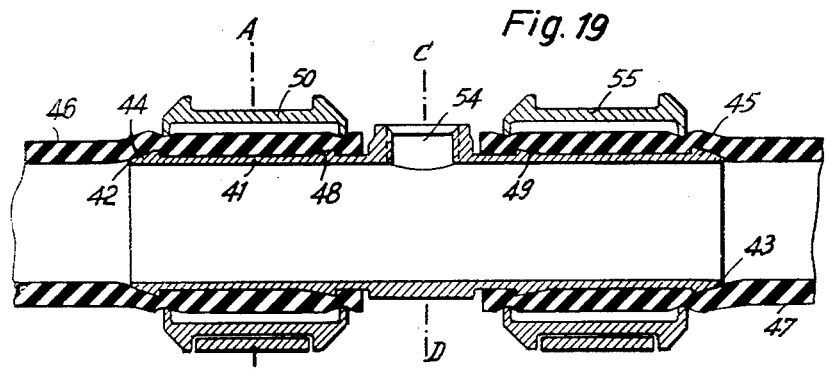
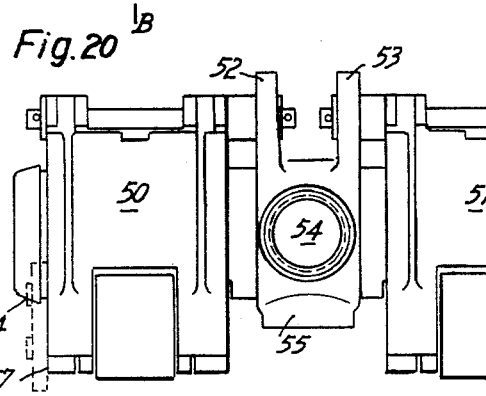
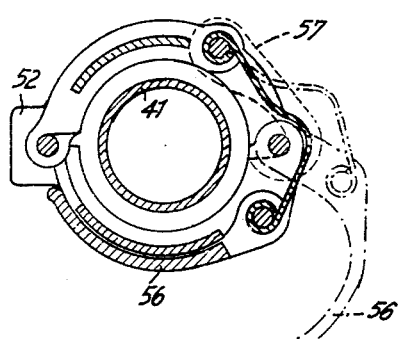
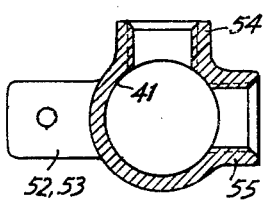

United States Patent Office 3,206,230
Patented Sept. 14, 1965

3,206,230
HOSE COUPLING
Karl Weinhold, 91 Neusser Strasse, Dusseldorf, Germany
Filed Feb. 23, 1961, Ser. No. 91,232
Claims priority, application Germany, Feb. 23, 1960,
D 32,713; Dec. 13, 1960, D 34,941
2 Claims. (Cl. 285—114)

The invention relates to means for coupling or connecting hoses, for example for connecting to one another two hoses by means of an intermediate metal sleeve on the ends of which said hoses are drawn. The means according to the invention for connecting hoses is especially intended for cases in which the hoses are submitted to high pressures, e.g. hoses for compressed air used in mining equipment and machinery such as coal cutting machines and the like.

The invention is concerned with connecting means which consists of a sleeve on one end of which or on both ends of which the ends of the hoses are drawn in order to be clamped with the aid of spring-loaded clamping means pressing on the walls of the hoses by means of two flanges. Such a clamping means, which is known per se, consists of two flanged halves having each a U-shaped profile, which halves are pivoted to each other and are positioned around the hose to be coupled and connected by way of a leaf spring tensioned by the shifting of a lever.

The means according to the invention is characterized in that there are provided at at least one end of the sleeve two enlargements annularly surrounding the sleeve, which enlargements are suitably tapered towards the respective ends of the sleeve and offset at the opposite sides. The distance between the enlargements is somewhat smaller, preferably a few millimetres less, than the external width of the clamping means.

The clamping means is arranged around the hose in such a position that its U-shaped flanges press the wall of said hose closely behind the offset plane surfaces of the said enlargements, so that in this way a sealing of the hose against the walls of the sleeve is ensured, whereby also an unintentional withdrawal of the hose from the end of the sleeve is avoided.

According to a further feature of the invention, the clamping means is connected in such a way, e.g. by a rod pivoted on the clamping means, to a wing fixed on the sleeve so that the clamping means is kept, on the one hand, in a certain distance from the wing and, on the other hand, from the said enlargements, so that the flanges of the U-shaped profiles of the halves of the clamping means engage the hose, drawn over the said enlargements, suitably closely behind the offset surfaces of the same, (e.g. at a distance of 1–10 millimetres). If a material of a comparatively poor resilience is used for the hose the distance between the offset surface of the enlargements and the surface of the flanges is preferably somewhat larger, while with a hose of a very high resilience this distance needs only be small.

The rod connecting the clamping means with the wing of the sleeve may be adjustable with regard to its length so that, by changing the length of this rod, the distance of the flanges of said clamping means from the enlargements may also be varied.

This may be obtained, by providing a thread on the end of the rod leading through a threaded bore of said wing and by retaining said end fixedly on the wing by way of a nut screwed onto the end. By screwing the nut along the rod the effective length of the rod and also the distance of the flanges from the enlargements may be varied.

Preferably the rod connecting the clamping means to the wing is arranged in the wing with such tolerance that the rod, together with the half of the clamping means connected to its other end, is easily removed from the clamped hose after releasing the clamping means.

This movable connection of the rod of the clamping means to the wing may be obtained in such a way that the end of the rod leading through the wing is arranged in an elongated hole of this wing or, alternatively, in that the end of the rod is spherically shaped and is pivoted in an opening of the wing which is correspondingly ball-shaped.

Furthermore, the rod connecting the clamping means to the wing may conveniently be formed as an extension of the pivot axis connecting the two halves of the clamping means.

The sleeve may suitably be provided adjacent to the wing a reinforcement or the like limiting the extent to which the hose can be drawn on to the sleeve.

The invention further provides means for coupling two hoses to one another. In this case a sleeve is used on either end of which a hose is drawn. This sleeve is provided at either end with a pair of the enlargements mentioned above. Each of the hoses has its end clamped by means of a clamping means of the kind described so that the U-shaped flanges of the halves of each clamping means engage the walls of the hose at a small distance from the offset surfaces of the enlargements of the sleeve. In this case, according to the invention, the sleeve is provided in its medial part with two wings, one of which respectively serves as a bearing for a rod determining on the one hand the distance of the clamping means from the corresponding wing and, on the other hand, also the distance from the offset surfaces of the corresponding annular enlargements of the sleeve. This rod may be formed, as described above, also as an extension of the pivot axis of the halves of the corresponding clamping means.

Furthermore, the bearing or the means for adjusting the effective length of the rod may be made as described above.

Between the wings arranged in the medial part of the sleeve connecting two hoses, there may be provided openings, such as screw threaded apertures, into which other fittings, e.g. valves or cocks may be screwed, or where branch pipes may be connected. The apertures may also be closed, if necessary, by screw plugs. In any case the ends of the hose have to be drawn on one end of a sleeve to such an extent that the wall of the hose completely covers both the enlargements arranged at either end of the sleeve so that the hose is clamped closely behind said two enlargements.

Several embodiments of the invention are shown, by way of example in the accompanying drawings, in which.

Figure 13:
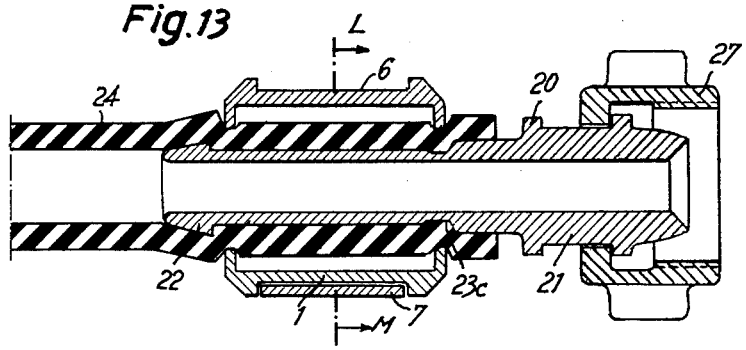
Figure 14:
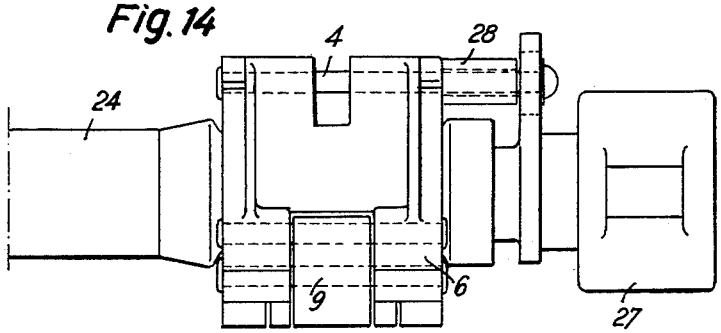
Figure 15:
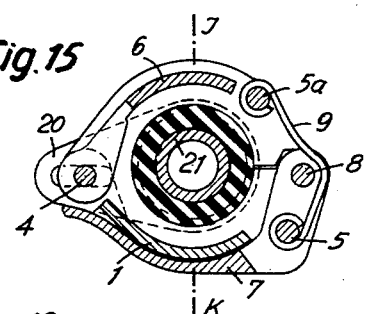
Figure 16:
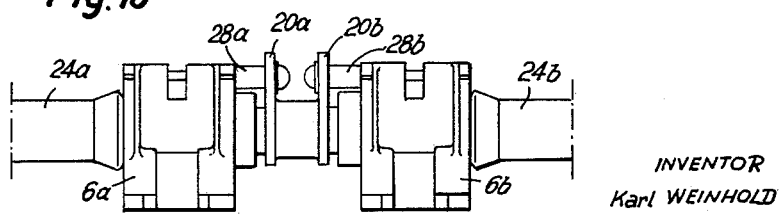
Figure 17:
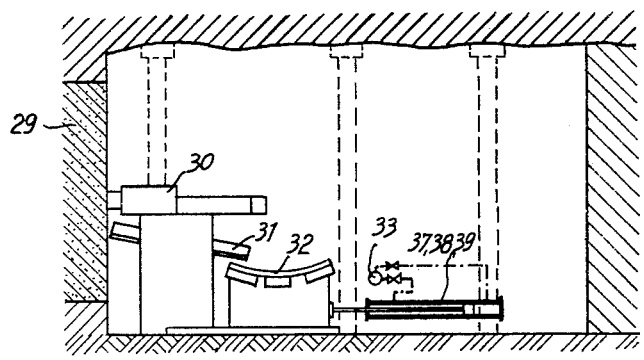
Figure 18:
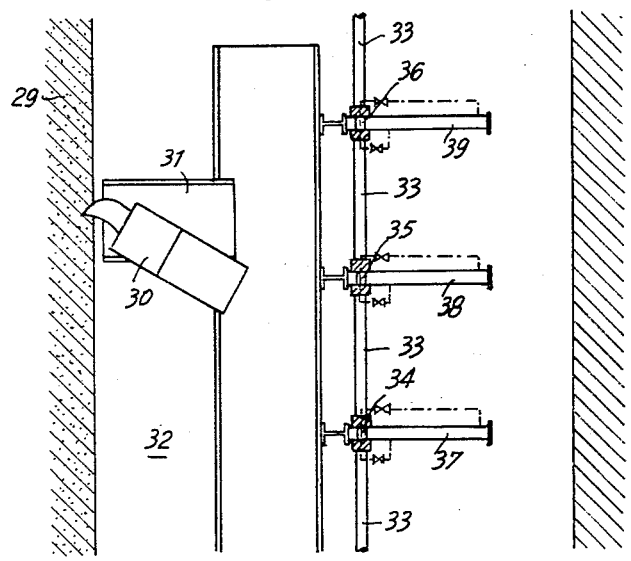

FIGURE 7 shows a partial view of the clamping means according to the invention it being used as a connection for a hose drawn over a sleeve, FIGURE 8 is a front view of the means according to FIGURE 7, FIGURE 9 is a section along the line E–F in FIGURE 7, FIGURE 10 is a section along the line G–H in FIGURE 7, FIGURE 11 is a sectional view illustrating the connection of two hoses by an intermediate sleeve, FIGURE 12 is a partial front view partly in section view of a modified arrangement of the clamping means, FIGURE 13 is a vertical section along the line J–K of FIGURE 15 through another embodiment of the invention, FIGURE 14 is a plan view of FIGURE 13, FIGURE 15 is a section along the line L–M of FIGURE 13, FIGURE 16 shows a means for connecting two hoses similar to that shown in FIGURE 12 to FIGURE 14 on a reduced scale, FIGURE 17 is a vertical section through a coal mine working, showing the application of the hose fittings according to the invention in a coal mine, FIGURE 18 is a plan of the mine working of FIGURE 17, and FIGURES 19 to 22 show further embodiments of the clamping means according to the invention which are particularly suited for use in a device as illustrated in FIGURES 17 and 18.

Figure 4:
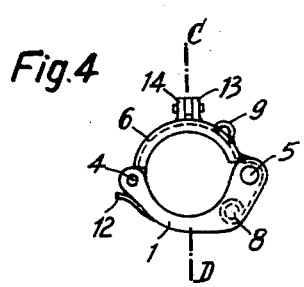
FIGURE 4 is a side view of the clamping means in closed position.
Figure 6:
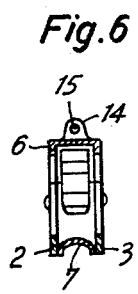
FIGURE 6 is a section along the line D–C in FIGURE 4.
Figure 5:
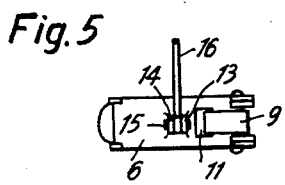
FIGURE 5 is a front view of a clamping means as shown in FIGURE 4.

In the drawings, in FIGURES 1 to 6, reference number 1 denotes one of the halves of a clamping means consisting of two U-shaped laminae 2 and 3 held togther by bolts 4 and 5. Pivotably connected to bolt 4 is the second U-shaped half 6 of the clamping means formed with a U-shaped cross section. A clamping lever 7 is arranged to be swung about the bolt 5, on which lever a tension leaf spring 9 is mounted by means of a bolt 8. To close the clamping means, the half 6 is shifted to such an extent that the hook-shaped end 10 of the tension spring 9 may be hooked into a square shaped aperture 11 of part 6. By shifting or pressing down the clamping lever 7 the clamping means is brought into the position shown in FIGURE 4, whereby, due to the eccentric arrangement of the tension spring 9, the two halves of the clamping means are drawn together. In the closed state of the clamping means, the clamping lever 7 and the spring 9 move to between the laminae 2 and 3 of the lower part. The bolt lever 7 has only its operating end 12 slightly protruding as is illustrated in FIGURES 4 and 6.

The half 6 of the clamping means which, on closing the latter, is not in the path of the clamping lever 7, is provided with a projection in form of two traverse members 13 and 14 arranged in parallel. Those members 13, 14 serve as a bearing for a bolt 15 on which a bar 16 is pivoted. The opposite end of the bar is, as will be described hereinafter, movably connected to a wing mounted on a sleeve receiving the hose.

In FIGURE 7 there is illustrated such a hose connection, similar reference numerals being used for similar parts as in FIGURES 1 to 6. Here the sleeve 21 is provided, according to the invention, with two enlargements 22, 23 annularly surrounding the sleeve over which the hose end 24 is drawn. The movement of pushing the hose onto the sleeve is limited by a stud 20a of a wing 20.

If the clamping means, which is connected to the wing 20 as explained later, is placed about the hose end pushed onto the sleeve 21, and is closed by shifting the bolt lever 7, the flanges 2 and 3 of the collar 1 as well as the flanges 25, 26 of the half 6 of the clamping means press, at a very small distance from the enlargements 22, 23 on the wall of the hose so that the latter is pressed firmly to the wall of sleeve 21, whereby a complete seal is obtained. The half 1 of the clamping means may, as well as the half 6, be made as one piece, for instance as a casting.

The connection of the clamping means to the wing 20 mounted on sleeve 21 may be formed as shown in FIGURES 7 to 11.

According to FIGURE 7 the free end of bar 16 is provided with a thread and is secured by means of nuts 18, 19 to the wing 20, through which the bar 16 is passed with a clearance. The wing 20 is formed integrally with the sleeve 21, or is in any suitable way, for instance by welding, connected with it. In order to obtain a sufficient mobility of bar 16 during the opening and closing movements of the clamping means the aperture in wing 20 is conveniently made in the form of oblong hole 16a. It will be seen that the rod 16 locates the clamping means axially relatively to the sleeve 20 and this location is adjustable.

In FIGURES 8, 9 and 10 similar reference numerals are used for similar parts as in in FIGURE 7.

In FIGURE 11 similar reference numerals are used as in FIGURE 7 to designate the clamping means for the sleeve provided in this case on both ends of the sleeve as well as for the connected hoses. The reference numerals are here provided with suffixes a and b, respectively, for both ends of the sleeve. In FIGURE 11, the clamping means described is used for coupling two hose ends in such a way that, together with the intermediate sleeve 21a, 21b, it forms a complete "hose-coupling."

According to FIGURE 12, for accurately adjusting the clamping means relative to the sleeve the bar 16 is provided with a ball-shaped head 16b screwed or riveted onto the same, in order to allow an increased mobility of the halves of the clamping means when they are closed or opened. For this purpose the wing 20 is provided with a conical aperture through which the bar 16 is passed and within which said bar may be swung laterally due to the ball-shaped bearing of ball head 16b.

Figure 1:
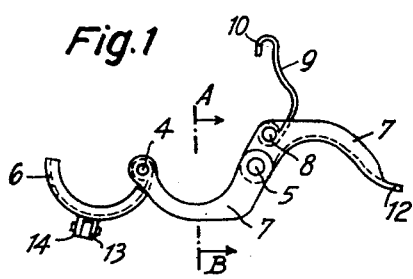
FIGURE 1 is a side view of a clamping means according to the invention in opened position.
Figure 3:
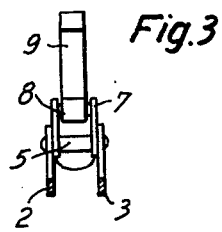
FIGURE 3 is a section along the line A–B in FIGURE 1.
Figure 2:
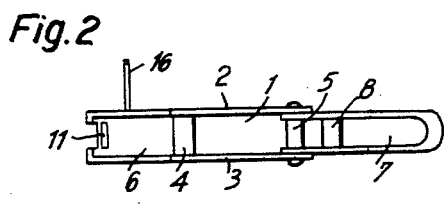
FIGURE 2 is a front view of the clamping means shown in FIGURE 1.

FIGURES 13 to 16 illustrate a modified embodiment of the invention, according to which the pivot of the two halves of the clamping means is extended and serves for adjusting and maintaining the distance of the same from tht wing of the sleeve on the one hand and from the rear surfaces of the annular enlargements of the sleeve on the other hand. Here again similar reference numerals designate similar parts as in FIGURES 7 to 12. The extended pivot 4 has one end laterally movably attached in the wing 20, e.g. in an oblong hole, as described with reference to FIGURE 10. Since in many cases, it is not necessary to completely open the clamping means in order to push the hose end 24 onto the sleeve 21, the second end of tension spring 9 may, instead of being hooked into an aperture 11 of the one half of the clamping means as shown in FIGURE 2, be pivoted also to a bolt 5a of said half of the clamping means. The slight opening of the clamping means allowed hereby is sufficient for handling the hose end in the manner described. Instead of the second enlargement 23 there may be arranged in the sleeve, as shown in FIGURE 13, a recess or groove 23c in which the walls of the hose are clamped by means of the flanges of the halves of the clamping means. In this case the sleeve 21 is conveniently reinforced by enlargement at the outside at the transition from the recess 23c to the wing 20.

As shown in FIGURES 13 and 14 the sleeve 21 may have at its end free from the hose a clamping nut 27 for connection to a pipe or hose line. Reference numeral 28 designates a bearing spacer the length of which is selected in accordance with the distance of the flanges of the clamping means from the enlargements or grooves of sleeve 21.

FIGURE 16 illustrates again a coupling for two hoses, whereby the reference numerals of both ends are distinguished by the letters a and b. The arrangement is otherwise the same as that shown in FIGURES 13 to 15.

In FIGURES 17 and 18 is shown by way of example, the application of the hose connection according to the invention to equipment employed in a coal mine.

Reference numeral 29 designates a coal seam exploited by means of a coal cutter 30. The coal is delivered by means of a chute to a conveyer belt which transfers the coal to further conveyer. A hose line 33 is supplied with compressed air. The separate parts of the hose line are connected with one another by way of the connecting means 34, 35, 36 according to the invention. The sleeves of the said means are provided with compressed air pipe connections for pressure cylinders 37, 38, 39 which serve, for example, for the actuation of the conveyer belt 32, as well as for the operation of the coal cutter 30.

According to FIGURES 19 to 22, reference numeral 41 designates the connecting sleeve of two hoses, adapted to the inside hose diameter, the conical ends 42, 43 of which sleeve being provided with lugs 44, 43, for drawing up the two hose ends 46, 47. In addition the sleeve is provided at either side with further conical reinforcements 48, 49 respectively, spaced apart from said lugs, the distance of the highest edge of which reinforcements from the marginal edge of the lugs is about 2 mm. smaller than the width of clamping means 50, 51, engaging immediately beside the conical lugs 44, 45 and the reinforcements 48, 49.

The clamping means arranged on both ends of the sleeve 41 are formed as described hereinbefore. The distance between the highest edges of the conical reinforcements 44, 48 and 45, 49 respectively of sleeve 41, is conveniently kept a few millimetres smaller than the width of the clamping means 50, 51, (measured from flange to flange) engaging the hose 46 immediately beside those conical reinforcements.

The mid portion of the connecting sleeve is conveniently reinforced in any suitable manner, and is provided, apart from the bearings 52, 53 for the hinge bolts of the clamping means with one, two or more projections 54, 55, having tapped holes, which projections serve for connecting branch pipes provided with appropriate cocks or self-acting pipe-closing valves. If no connections are required the mid portion of the connecting sleeve may be made plain i.e. without the provision of such projections.

In order to avoid any unintended loosening of the clamping means, for example on breaking of the tension spring, it is convenient to secure the closing lever 56 by a retaining hook 57, embracing both the bolts for the spring, as is indicated by dotted lines in FIGURES 20 and 21.

The hose connection described is also suitable, apart from being used for coal-working, for employment under similar conditions, e.g. for lime-cutting and the like operations, and also for all conditions where a medium under high pressure, e.g. air or water, is used in a hose-connecting system which is subjected during use to heavy mechanical stresses or local displacements. Under all such conditions the hose connection described is particularly suitable, not only in that the use of special constructions is dispensed with, as in every case simple pressure hose can be used, but also for the absolute security which is ensured even under considerable mechanical stresses.

The absolute security of the device described can be still further increased by the lever 7 of the clamping device being secured in the closed position by a releasable rigid yoke or pin (not shown in the drawing). This pin holds the clamping device together in the closed position even when, e.g. through mechanical action the spring of the clamping device is destroyed by external means.

The fixity of the connection between hose pipes obtainable by the device described can be seen from the fact that in a tear test which was carried out with the hose fitting described in a mine-works, the compressed air hose burst at a pressure of 56 atmospheres gauge pressure and under a tensile stress of 1800 kg. the hose tore away from the point of connection, without the hose connection formed according to the invention being destroyed or being released from the hose.

I claim:
1. A hose coupling means comprising a hollow sleeve having at least one end portion and a base portion, the base portion having at least one radially projecting wing element mounted thereon having an axially extending hole therethrough near its radial outer end, a bar having one end secured within the hole of the wing element and the other end pivotally mounting hose clamping means, said hose clamping means comprising a lever and two U-shaped sections pivoted together, each of said sections having apertures formed in adjacent longitudinal end surfaces thereof, said bar being disposed through said apertures in pivotal supporting relation with said sections, each section having an inwardly extending flange at each side thereof, the outer surface of the end portion of the sleeve having two spaced abrupt shoulders and surfaces tapering from each shoulder toward the end of the sleeve, said end portion of the sleeve being adapted to receive the end of a hose, and the spaced flanges of said clamp being adapted to encircle said end portion of the sleeve and hose and to cooperate with said spaced shoulders to clamp the hose securely to the sleeve.

2. A hose coupling means as defined in claim 1, said base portion being positioned between two end portions and having two of said radially projecting wing elements mounted thereon in axially spaced relation, the said bars secured in said wing elements projecting longitudinally in opposite directions, each bar respectively extending along the end portion adjacent thereto, whereby hose clamping means are pivotally supported adjacent each end portion.

References Cited by the Examiner
UNITED STATES PATENTS

| | | | |
|---|---|---|---|
| 576,119 | 2/97 | Hess | 285—259 |
| 1,072,896 | 9/13 | Albee | 285—253 |
| 1,110,011 | 8/14 | Schneider | 285—252 |
| 1,204,650 | 11/16 | Claflin | 285—253 |
| 1,911,486 | 5/33 | Bacheldor et al. | 285—114 |
| 2,725,246 | 11/55 | Weinhold | 285—252 |

CARL W. TOMLIN, *Primary Examiner.*